(12) United States Patent
Wang et al.

(10) Patent No.: US 11,810,233 B2
(45) Date of Patent: Nov. 7, 2023

(54) END-TO-END VIRTUAL OBJECT ANIMATION GENERATION METHOD AND APPARATUS, STORAGE MEDIUM, AND TERMINAL

(71) Applicants: MOFA (SHANGHAI) INFORMATION TECHNOLOGY CO., LTD., Shanghai (CN); SHANGHAI MOVU TECHNOLOGY CO., LTD., Shanghai (CN)

(72) Inventors: Congyi Wang, Shanghai (CN); Bin Wang, Shanghai (CN); Jinxiang Chai, Shanghai (CN)

(73) Assignees: MOFA (SHANGHAI) INFORMATION TECHNOLOGY CO., LTD., Shanghai (CN); SHANGHAI MOVU TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/023,993

(22) PCT Filed: Aug. 9, 2021

(86) PCT No.: PCT/CN2021/111423
§ 371 (c)(1),
(2) Date: Feb. 28, 2023

(87) PCT Pub. No.: WO2022/048404
PCT Pub. Date: Mar. 10, 2022

(65) Prior Publication Data
US 2023/0267665 A1 Aug. 24, 2023

(30) Foreign Application Priority Data
Sep. 1, 2020 (CN) .......................... 202010905550.3

(51) Int. Cl.
*G06T 13/20* (2011.01)
*G06T 13/40* (2011.01)
(Continued)

(52) U.S. Cl.
CPC ............ *G06T 13/205* (2013.01); *G06T 13/40* (2013.01); *G10L 13/02* (2013.01); *G10L 13/08* (2013.01); *G10L 15/187* (2013.01)

(58) Field of Classification Search
CPC ....... G06T 13/205; G06T 13/40; G10L 13/02; G10L 13/08; G10L 15/187
See application file for complete search history.

(56) References Cited

U.S. PATENT DOCUMENTS
2019/0130628 A1  5/2019  Cao et al.

FOREIGN PATENT DOCUMENTS
CN  104361620 A  2/2015
CN  106653052 A  5/2017
(Continued)

OTHER PUBLICATIONS
English Machine Translation of CN-107564511-A (Year: 2018).*
(Continued)

*Primary Examiner* — King Y Poon
*Assistant Examiner* — Vincent Peren
(74) *Attorney, Agent, or Firm* — KDW Firm PLLC (57) ABSTRACT

An end-to-end virtual object animation generation method includes receiving input information, where the input information includes text information or audio information of a virtual object animation to be generated; converting the input information into a pronunciation unit sequence; performing a feature analysis of the pronunciation unit sequence to obtain a corresponding linguistic feature sequence; and inputting the linguistic feature sequence into
(Continued)

a preset timing mapping model to generate the virtual object animation based on the linguistic feature sequence.

18 Claims, 2 Drawing Sheets

(51) Int. Cl.
*G10L 15/187* (2013.01)
*G10L 13/08* (2013.01)
*G10L 13/02* (2013.01)

(56) References Cited

FOREIGN PATENT DOCUMENTS

| CN | 107564511 | A | * | 1/2018 | ............. G10L 13/02 |
|----|-----------|---|---|--------|--------------------------|
| CN | 107564511 | A |   | 1/2018 |                          |
| CN | 108447474 | A |   | 8/2018 |                          |
| CN | 109377540 | A |   | 2/2019 |                          |
| CN | 110379430 | A |   | 10/2019|                          |
| CN | 111145322 | A |   | 5/2020 |                          |
| CN | 112184859 | A |   | 1/2021 |                          |

OTHER PUBLICATIONS

International Search Report dated Oct. 26, 2021, for Application No. PCT/CN2021/111423 (five (5) pages).
The First Office Action dated Mar. 18, 2022 for Chinese Patent Application No. 202010905550.3 (18 pages).
The Second Office Action dated Jun. 2, 2022 for Chinese Patent Application No. 202010905550.3 (21 pages).
The Third Office Action dated Nov. 3, 2022 for Chinese Patent Application No. 202010905550.3 (21 pages).

* cited by examiner

END-TO-END VIRTUAL OBJECT ANIMATION GENERATION METHOD AND APPARATUS, STORAGE MEDIUM, AND TERMINAL

CROSS-REFERENCES TO RELATED APPLICATIONS

This application is a national stage application filed under 35 U.S.C. 371 based on International Patent Application No. PCT/CN2021/111423, filed on Aug. 9, 2021, which claims priority to Chinese Patent Application No. 202010905550.3 filed with the China National Intellectual Property Administration (CNIPA) on Sep. 1, 2020, the disclosures of which are incorporated herein by reference in their entireties.

TECHNICAL FIELD

The present disclosure relates to the field of virtual digital objects, particularly an end-to-end virtual object animation generation method and apparatus, a storage medium, and a terminal.

BACKGROUND

With the rapid development of the virtual digital object (shortened to virtual object) technology and the animation industry, the demand for rapid and automatic generation of a realistic virtual image is increasing in the market. How to generate a realistic virtual digital object animation that matches speech is an extremely important step in generating a realistic virtual image.

In a conventional virtual object animation generation technology, a virtual object animation is produced by an animator and a painter manually and delicately. When a virtual object animation is produced manually based on the original audio received at an input terminal, the production process requires high labor and time costs, and end-to-end automatic virtual object animation generation cannot be achieved.

In recent years, with the rapid development of computer deep learning technology, an end-to-end virtual object animation generation technology through which a virtual object animation is generated directly according to an audio feature has emerged, greatly accelerating the production process of a high-fidelity virtual object animation.

However, such an end-to-end virtual object animation generation technology currently in the mainstream analyzes an original input audio signal on an acoustic basis to generate a corresponding virtual object animation. This technology relies on a particular audio feature and is applicable to a dubber having a particular speech feature, severely restricting generality of this technology and a further reduction in the production costs.

In addition, in an existing end-to-end virtual object animation generation technology, generally only audio is used as input, and generation of a virtual object animation cannot be driven by original text input. This limits the input selectivity of the virtual object animation generation technology to some extent, affecting the user experience.

SUMMARY

The problem to be solved by the present disclosure is how to provide a more general-purpose end-to-end virtual object animation generation solution.

To solve this problem, an embodiment of the present disclosure provides an end-to-end virtual object animation generation method. The method includes receiving input information, where the input information includes text information or audio information of a virtual object animation to be generated; converting the input information into a pronunciation unit sequence; performing a feature analysis of the pronunciation unit sequence to obtain a corresponding linguistic feature sequence; and inputting the linguistic feature sequence into a preset timing mapping model to generate the virtual object animation based on the linguistic feature sequence.

DETAILED DESCRIPTION

As stated in the background, an existing end-to-end virtual object animation generation technology must rely on a particular pronouncer to drive generation.

To solve this problem, an embodiment of the present disclosure provides an end-to-end virtual object animation generation method. The method includes receiving input information, where the input information includes text information or audio information of a virtual object animation to be generated; converting the input information into a pronunciation unit sequence; performing a feature analysis of the pronunciation unit sequence to obtain a corresponding linguistic feature sequence; and inputting the linguistic feature sequence into a preset timing mapping model to generate the virtual object animation based on the linguistic feature sequence.

Compared with an existing solution that must use a particular speech feature of a dubber to drive end-to-end virtual object animation generation, a more general-purpose end-to-end virtual object animation generation solution is provided in the present solution to quickly and automatically generate a virtual object animation, especially a 3D animation. Moreover, the present solution involves more varied input selections.

Specifically, a corresponding linguistic feature sequence in the original audio or text is extracted as input information of a preset timing mapping model. The linguistic feature is related to only the semantic content of the audio and is not related to a tone color, a pitch, a fundamental frequency F0, and other features that vary with pronouncers; therefore, the present solution is not limited by a particular pronouncer. The preset timing mapping model is applicable to original audios having different audio features. That is, since the present solution does not analyze an audio feature in audio information, but converts the audio information into a pronunciation unit and analyzes a linguistic feature of the pronunciation unit, making it possible to generate a virtual object animation without relying on a particular audio feature to drive a neural network model. Thereby, the end-to-end virtual object animation generation method of the present solution is applicable to end-to-end virtual object animation generation of any dubber and any text, solving the problem in which an existing end-to-end automatic virtual object animation technology featured by a speech synthesis relies on a particular dubber and truly achieving generality of this technology.

Further, a preset timing mapping model is constructed based on the training by the deep learning technology, and an input linguistic feature sequence is mapped to an expression parameter and/or an action parameter of the corresponding virtual object by using the preset timing mapping model. The animation generation process does not require the participation of an animator and a painter and completely relies on the automatic calculation of a computer, greatly reducing the labor and time costs and truly achieving an end-to-end automatic virtual object animation synthesis technology.

Further, the received original input information may be text information or audio information so that the present solution can generate a corresponding virtual object animation according to different input modes.

The object, features, and beneficial effects of the present disclosure are more apparent from the detailed description of embodiments of the present disclosure in conjunction with drawings.

Figure 1:
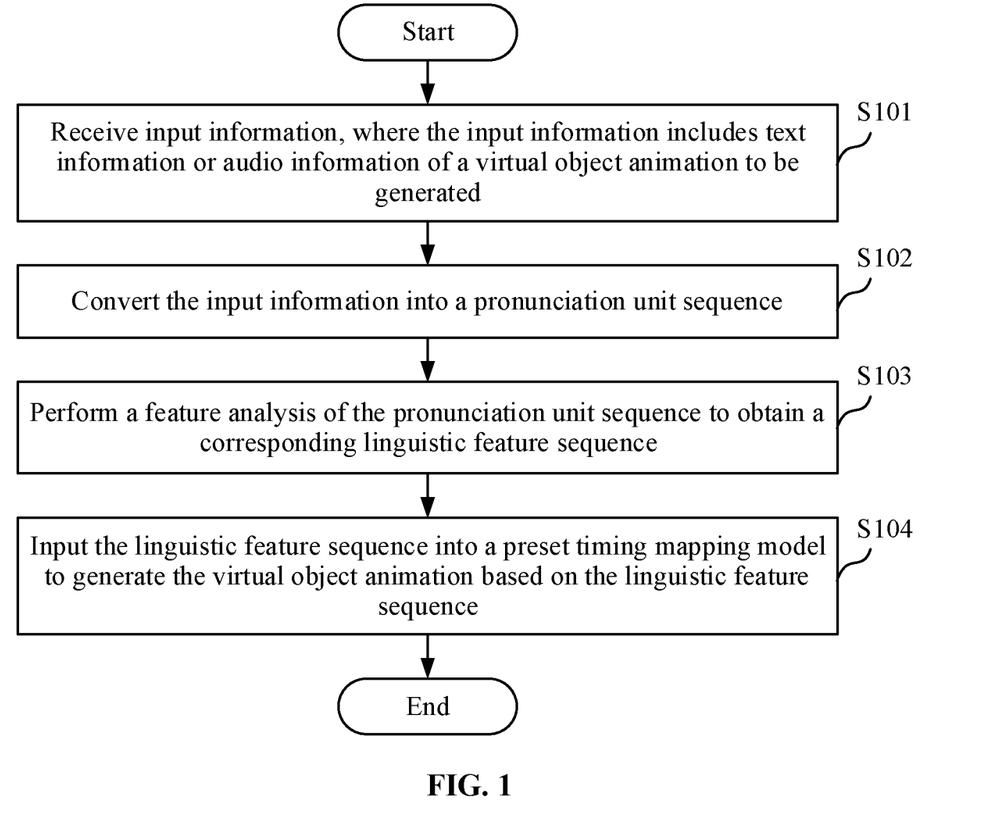
FIG. 1 is a flowchart of an end-to-end virtual object animation generation method according to an embodiment of the present disclosure.

FIG. 1 is a flowchart of an end-to-end virtual object animation generation method according to an embodiment of the present disclosure.

The solution of this embodiment is applicable to application scenarios including virtual digital object generation and animation production such as end-to-end virtual object animation generation applicable to multimodal input and any pronouncer.

The multimodal input may include speech input and text input.

Any pronouncer may mean that an audio feature of a pronouncer is not limited. The virtual object may be, for example, a virtual person, a virtual animal, or a virtual plant. The virtual object may be three-dimensional or two-dimensional.

End-to-end may mean that operations between the input terminal to the output terminal are performed by a computer with no intervention by a person such as a painter. Here the input terminal refers to a port for receiving the original audio and the original text, and the output terminal refers to a port for generating and outputting a virtual object animation.

A virtual object animation output by the output terminal may include a controller which is used for generating a virtual object animation and in the form of a sequence of digital vectors. For example, the virtual object animation may include a lip animation. The controller of the lip animation output by the output terminal may include offset information of a lip feature point.

When the controller of the lip animation is input into a rendering engine, the lip of a virtual object is driven to make a corresponding action.

That is, the controller for generating the virtual object animation may be a sequence of virtual object animation data. In this sequence, the data is arranged in the time sequence of input information and synchronized with the audio data acquired based on the input information. The virtual object animation data can drive the facial expression motion and the human pose motion of the virtual object. The final virtual object animation can be obtained through the rendering engine.

The virtual object animation data may include facial expression action data and body action data of the virtual object. The facial expression action data may include facial expression information and eye expression information of the virtual object. The body action data may include human pose information of the virtual object. In this embodiment, the facial expression action data is referred to as an expression parameter of the virtual object, and the body action data is referred to as an action parameter of the virtual object.

Specifically, referring to FIG. 1, the end-to-end virtual object animation generation method of this embodiment may include the following steps:

In step S101, input information is received, where the input information includes text information or audio information of a virtual object animation to be generated.

In step S102, the input information is converted into a pronunciation unit sequence.

In step S103, a feature analysis of the pronunciation unit sequence is performed so that a corresponding linguistic feature sequence is obtained.

In step S104, the linguistic feature sequence is input into a preset timing mapping model so that the virtual object animation is generated based on the linguistic feature sequence.

More specifically, the linguistic feature sequence may include multiple linguistic features, where each linguistic feature includes at least a pronunciation feature of a corresponding pronunciation unit.

Further, the preset timing mapping model may be configured to map the input linguistic feature sequence to an expression parameter and/or an action parameter of a virtual object according to a time sequence based on deep learning to generate the virtual object animation.

Further, the pronunciation unit sequence and the linguistic feature sequence are each a time-aligned sequence.

In an embodiment, the input information may be multimodal input such as audio information in the form of sound or text information in the form of text. The input information may be received from a client that requires generation of a virtual object animation.

In an embodiment, the input information may be audio information collected using a device such as a microphone in real time or text information input using a device such as a keyboard in real time.

Alternatively, the input information may be audio information or text information that has been collected or recorded in advance, and when a corresponding virtual object animation requires to be generated, the input information is wiredly or wirelessly transmitted to a computing device executing the solution of this embodiment.

In an embodiment, the input information may be divided into minimum pronunciation units that constitute a pronunciation unit sequence. The pronunciation unit sequence serves as a data basis for a subsequent linguistic feature analysis.

Specifically, step S102 may include converting the input information into multiple pronunciation units and corresponding time codes; and performing a time alignment operation on the pronunciation units according to the time codes to obtain a time-aligned sequence. For ease of description, the time-aligned pronunciation unit sequence of this embodiment is referred to as a pronunciation unit sequence.

A single pronunciation unit and a corresponding time code are denoted as one data set. Multiple such data sets may be converted from the input information after step S102 is performed. Each data set includes a single pronunciation unit and a corresponding time code. Pronunciation units in the multiple data sets may be time-aligned according to time codes so that a time-aligned pronunciation unit sequence is obtained.

When the input information is audio information, the audio information may be converted into text information that is processed so that a pronunciation unit and a corresponding time code are obtained.

When the input information is text information, the text information may be processed so that multiple pronunciation units and corresponding time codes are obtained.

The text information may take the form of words, characters, pinyin, and phonemes. When the input information is audio information, the audio information may be converted into multiple pronunciation units and corresponding time codes by using an automatic speech recognition (ASR) technology and a preset pronunciation dictionary.

When the input information is text information, a basic pronunciation unit and time-dimensional arrangement and duration information of the basic pronunciation unit may be extracted from the text information by using an alignment module and a front-end module in a text-to-speech (TTS) technology so that a time-aligned basic pronunciation unit sequence is obtained.

That is, in step S102, when the input information is audio information, it is feasible to convert the audio information into multiple pronunciation units and corresponding time codes by using a speech recognition technology and a preset pronunciation dictionary; and perform a time alignment operation on the pronunciation units according to the time codes to obtain a time-aligned pronunciation unit sequence.

When the input information is text information, it is feasible to convert the text information into multiple pronunciation units and corresponding time codes by using a speech synthesis technology; and perform a time alignment operation on the pronunciation units according to the time codes to obtain a time-aligned pronunciation unit sequence.

In an example in which each pronunciation unit is a phoneme, when the input information is audio information, it is feasible to extract a corresponding phoneme sequence and duration information of each phoneme from the original audio by using a speech recognition technology and a prepared pronunciation dictionary.

For another example, when the input information is text information, a non-time-aligned phoneme sequence of the original text and an alignment matrix of a phoneme and an output audio Mel spectrum may be obtained using an attention-based alignment module and a front-end module in a TTS technology. Then the phoneme corresponding to each time segment may be obtained using a dynamic programming algorithm so that a time-aligned phoneme sequence is obtained.

In an embodiment, after the time-aligned pronunciation unit sequence is obtained, to further promote the generalization capability of the preset timing mapping model, step S103 may be performed so that a linguistic feature analysis of the basic pronunciation unit sequence obtained in step S102 is performed so that a time-aligned linguistic feature sequence (shortened to linguistic feature sequence) is obtained.

Figure 2:
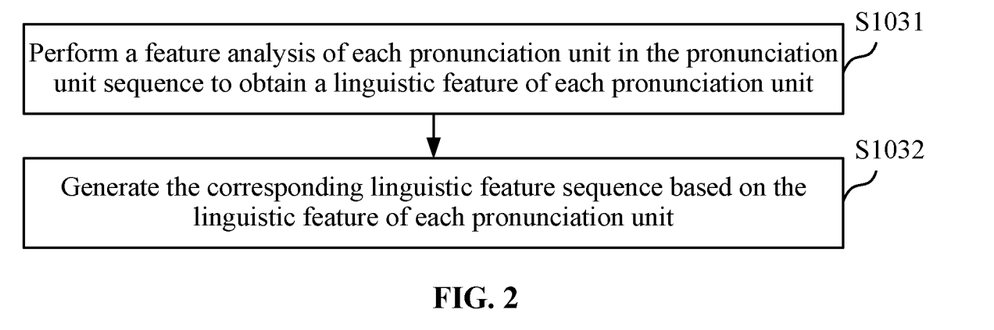
FIG. 2 is a flowchart of an embodiment of step S103 of FIG. 1.

Specifically, referring to FIG. 2, step S103 may include the following steps:

In S1031, a feature analysis of each pronunciation unit in the pronunciation unit sequence is performed so that a linguistic feature of each pronunciation unit is obtained.

In S1032, the corresponding linguistic feature sequence is generated based on the linguistic feature of each pronunciation unit.

More specifically, a linguistic feature of a pronunciation unit may indicate a pronunciation feature of the pronunciation unit. For example, the pronunciation feature includes, but is not limited to, whether the pronunciation unit is an alveolar nasal or a velar nasal, whether the pronunciation unit is a monophthong or a diphthong, whether the pronunciation unit is an aspirated consonant or an unaspirated consonant, whether the pronunciation unit is a fricative consonant, or whether the pronunciation unit is an apical consonant.

In an embodiment, a linguistic feature of a pronunciation unit may include an independent linguistic feature resulting from a feature analysis of the pronunciation unit.

Specifically, step S1031 may include analyzing a pronunciation feature of each pronunciation unit to obtain an independent linguistic feature of each pronunciation unit; and generating the linguistic feature based on the independent linguistic feature.

More specifically, the independent linguistic feature of a pronunciation unit may indicate a pronunciation feature of the pronunciation unit.

In an example in which each pronunciation unit is a phoneme, a pronunciation feature of each phoneme may be obtained from a feature analysis of each phoneme in the time-aligned phoneme sequence obtained in step S102.

A pronunciation feature to be analyzed for each phoneme may include {whether it is a nasal; whether it is an alveolar nasal; whether it is a velar nasal; whether it is a monophthong; whether it is a diphthong; whether it is an aspirated consonant; whether it is a fricative consonant; whether it is a voiceless sound; whether it is a voiced sound; whether it is a labial consonant; whether it is an apical consonant; whether it is a blade-alveolar; whether it is a retroflex; whether it is a cacuminal; whether it is a grooved alveolar consonant; whether it is a vowel containing A; whether it is a vowel containing E; whether it is a vowel containing I; whether it is a vowel containing O; whether it is a vowel containing U; whether it is a vowel containing V; whether it is a plosive; whether it is mute; whether it is an initial consonant; whether it is a simple or compound vowel}.

These questions are required to be asked and answered for each phoneme. When answering these questions, 0 indicates "no", and 1 indicates "yes". In this manner, an independent linguistic feature in the form of quantification coding is generated for each phoneme.

In an embodiment, in view of co-pronunciation and coherence of a generated animation, pronunciation units that are time-adjacent to the current pronunciation unit may affect an animation action feature of the current pronunciation unit when these pronunciation units have different pronunciation features. Therefore, step S1031 may include analyzing a pronunciation feature of each pronunciation unit to obtain an independent linguistic feature of each pronunciation unit; analyzing a pronunciation feature of an adjacent pronunciation unit of each pronunciation unit to obtain an adjacent linguistic feature of each pronunciation unit; and generating the linguistic feature of each pronunciation unit based on the independent linguistic feature and the adjacent linguistic feature.

Specifically, all adjacent pronunciation units of each pronunciation unit may be analyzed within a certain time window range. Dimensions of the analysis include, but are not limited to, how many vowels or consonants exist in the left window of the current pronunciation unit, and how many alveolar nasals or velar nasals exist in the right window of the current pronunciation unit.

For example, statistics on the type of the pronunciation feature of the adjacent pronunciation unit and the number of pronunciation features of the same type are collected, and the adjacent linguistic feature is obtained according to a statistical result.

Further, the quantified statistical feature may be used as an adjacent linguistic feature of the current pronunciation unit.

Further, for each pronunciation unit, adjacent pronunciation units of a pronunciation unit may be a preset number of pronunciation units located before and after the pronunciation unit according to a time sequence with the pronunciation unit as the center.

The value of the preset number may be determined by an experiment, for example, an evaluation index used when the preset timing mapping model is trained.

Each statistical feature on the right of the pronunciation unit located at the end of a sentence is zeroed.

Each statistical feature on the left of the pronunciation unit located at the start of a sentence is zeroed.

In an example in which each pronunciation unit is a phoneme, for each phoneme in the time-aligned phoneme sequence obtained in step S102, with the current phoneme as the center, statistics on pronunciation features of 20 consecutive phonemes on the left of the current phoneme and 20 consecutive phonemes on the right of the current phoneme are collected.

Statistics on pronunciation features of 20 consecutive phonemes on the left of the current phoneme and 20 consecutive phonemes on the right of the current phoneme are collected in the following dimensions: {the number of vowels on the left of the central pronunciation unit; the number of consonants on the left of the central pronunciation unit; the number of vowels on the right of the central pronunciation unit; the number of consonants on the right of the central pronunciation unit; the number of adjacent vowels on the left of the central pronunciation unit; the number of adjacent consonants on the left of the central pronunciation unit; the number of adjacent vowels on the right of the central pronunciation unit; the number of adjacent consonants on the right of the central pronunciation unit; the number of adjacent alveolar nasals on the left of the central pronunciation unit; the number of velar nasals on the left of the central pronunciation unit; the number of adjacent alveolar nasals on the right of the central pronunciation unit; the number of adjacent velar nasals on the right of the central pronunciation unit}.

In the preceding statistical dimensions, all adjacent phonemes of each phoneme are analyzed, and the quantified statistical feature is used as an adjacent linguistic feature of the current phoneme.

Further, for each pronunciation unit, an independent linguistic feature and an adjacent linguistic feature of a pronunciation unit are combined into a complete linguistic feature of the pronunciation unit.

For example, an independent linguistic feature in the form of quantification coding and an adjacent linguistic feature of a pronunciation unit are combined into a linguistic feature of the pronunciation unit. That is, the linguistic feature of the pronunciation unit is a long array consisting of a series of quantified values.

In an embodiment, in step S1032, linguistic features of pronunciation units arranged according to a time sequence are combined in sequence to form a quantified linguistic feature sequence.

The linguistic feature sequence is a result of feature quantification of the input information. The quantification is not limited or driven by a particular pronouncer.

Further, after the quantified linguistic feature sequence is obtained, step S104 may be performed so that the linguistic feature sequence is input into the preset timing mapping model so that a corresponding virtual object animation data sequence is obtained.

Figure 3:
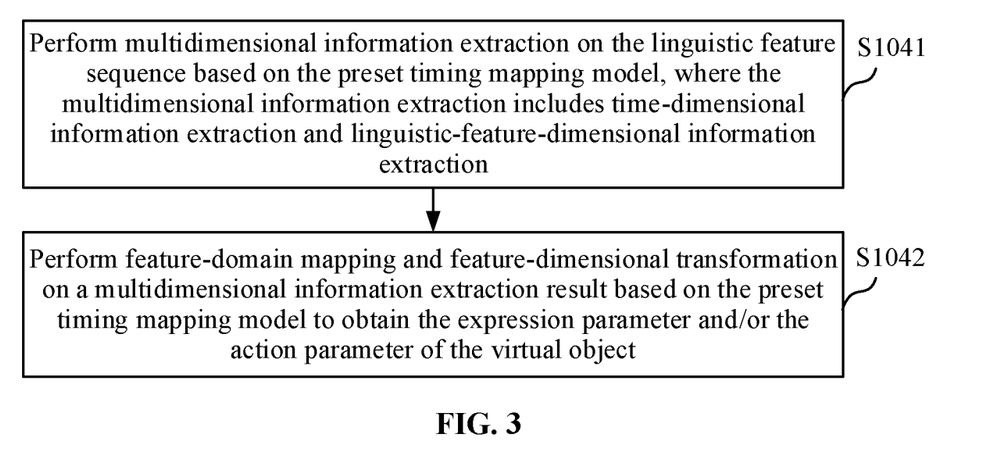
FIG. 3 is a flowchart of an embodiment of step S104 of FIG. 1.

In an embodiment, referring to FIG. 3, step S104 may include the following steps:

In step S1041, multidimensional information extraction is performed on the linguistic feature sequence based on the preset timing mapping model, where the multidimensional information extraction includes time-dimensional information extraction and linguistic-feature-dimensional information extraction.

In S1042, feature-domain mapping and feature-dimensional transformation are performed on a multidimensional information extraction result based on the preset timing mapping model so that the expression parameter and/or the action parameter of the virtual object is obtained.

The feature-domain mapping is a mapping from a linguistic feature domain to a virtual object animation feature domain. The virtual object animation feature domain includes the expression parameter and/or the action parameter of the virtual object.

Specifically, the length of the audio information or the text information input in step S101 is not fixed; therefore, information about the variable-length sequence (that is, the linguistic feature sequence) obtained from processing based on the input information may be processed based on a recurrent neural network (RNN) and its variant (for example, a long short-term memory (LSTM)). In this manner, feature information is extracted from the entirety.

Further, the RNN may process an input feature in a time dimension, but to process the input feature in more dimensions to extract feature information in a higher dimension to enhance the generalization capability of the model, it is feasible to process the input information by using a convolutional neural network (CNN) and its variant (for example, dilated convolution or causal convolution).

Further, a feature mapping model such as the preset timing mapping model usually involves feature-domain conversion and feature-dimensional transformation. In this regard, this conversion function may be achieved by using a fully-connected network (FCN).

Further, after the preset timing mapping model is designed, it is feasible to use prepared training data and a machine learning technology to train the preset timing mapping model and search for an optimal parameter of the preset timing mapping model to achieve a mapping from a linguistic feature sequence to a virtual object animation sequence.

Further, the preset timing mapping model may be a model capable of using timing information (for example, synchronously-time-aligned text information or audio information) to predict other timing information (for example, virtual object animation).

In an embodiment, training data of the preset timing mapping model may include text information and virtual object animation data and speech data synchronous with the text information.

Specifically, a professional recorder (and actor) presents speech data and action data (one-to-one speech-action) based on rich and emotional text information. The action data includes a facial expression action and a body action. The facial expression action involves information such as a facial or eye expression.

After a correspondence is established between a facial expression action and a virtual object controller, virtual object facial expression controller data is obtained. A body action may be obtained after a performance capture platform captures high-quality pose information data of the performance of an actor. Body action data is in time-correspondence with expression data. Thus, corresponding virtual object animation data can be obtained by a mapping based on a digital vector sequence (that is, the linguistic feature sequence).

Similar to the driving logic of a facial expression action, the driving of a body action may also be implemented based on a controller. Alternatively, the driving of a body action may also be skeleton-driven.

In an embodiment, the preset timing mapping model may be a convolutional LSTM deep neural network (CLDNN).

This embodiment is described in detail by using the preset timing mapping model composed of the preceding three networks as an example. However, in practical application, the structure of the preset timing mapping model may not be limited to this. For example, the preset timing mapping model may be any one of the preceding three networks or a combination of any two of the preceding three networks.

Specifically, the preset timing mapping model may include a multilayer convolutional network for receiving the linguistic feature sequence and performing multidimensional information extraction on the linguistic feature sequence.

For example, the multilayer convolutional network may include a four-layer dilated convolutional network for performing multidimensional information extraction on the quantified linguistic feature sequence obtained in step S103. The linguistic feature sequence may be two-dimensional data. Assuming that each pronunciation unit is represented by a 600-bit pronunciation feature and there are 100 pronunciation units in total, then the linguistic feature sequence input into the preset timing mapping model is a 100×600 two-dimensional array. 100 indicates a time dimension. 600 indicates a linguistic feature dimension. Accordingly, a feature operation is performed on the multilayer convolutional network in both a time dimension and a linguistic feature dimension.

Further, the preset timing mapping model may further include a long short-term memory network for performing information aggregation processing on the time-dimensional information extraction result. Thus, features that have been convolutionally processed by the multilayer convolutional network can be considered as a whole consecutively in a time dimension.

For example, the long short-term memory network may include a two-layer stacked bidirectional LSTM network coupled to the multilayer convolutional network to acquire a time-dimensional information extraction result of the linguistic feature sequence, where the extraction result is output by the multilayer convolutional network. Further, the two-layer stacked bidirectional LSTM network performs high-dimensional information processing on the time-dimensional information extraction result of the linguistic feature sequence to further obtain time-dimensional feature information.

Further, the preset timing mapping model may further include a deep neural network coupled to the multilayer convolutional network and the long short-term memory network. The deep neural network is configured to perform feature-domain mapping and feature-dimensional transformation on the multidimensional information extraction result to obtain the expression parameter and/or the action parameter of the virtual object, where the extraction result is output by the multilayer convolutional network and the long short-term memory network.

For example, the deep neural network may receive a linguistic-feature-dimensional information extraction result output by the multilayer convolutional network and may also receive an updated time-dimensional information extraction result output by the long short-term memory network.

The dimensional transformation may refer to a dimension reduction, for example, from 600 input features of the preset timing mapping model to 100 output features of the preset timing mapping model.

For example, the deep neural network may include multiple fully-connected layers connected in series, where the first fully-connected layer is configured to receive the multidimensional information extraction result, and the last fully-connected layer is configured to output the expression parameter and/or the action parameter of the virtual object. The number of the fully-connected layers may be three. Further, the deep neural network may also include multiple non-linear transformation modules, where each of the multiple non-linear transformation modules is coupled between two adjacent fully-connected layers of the multiple fully-connected layers other than the last fully-connected layer of the multiple fully-connected layers and is configured to perform non-linear transformation processing on an output result of an upper coupled fully-connected layer of the two adjacent fully-connected layers and input a non-linear transformation processing result into a lower coupled fully-connected layer of the two adjacent fully-connected layers.

The nonlinear transformation module may be a rectified linear unit (ReLU) activation function.

The nonlinear transformation module can promote the expression capability and the generalization capability of the preset timing mapping model.

In a variant embodiment, the multilayer convolutional network, the long short-term memory network, and the deep neural network may be connected in series in sequence; the linguistic-feature-dimensional information extraction result output by the multilayer convolutional network is transparently transmitted to the deep neural network through the long short-term memory network; and the time-dimensional information extraction result output by the multilayer convolutional network is processed by the long short-term memory network and then transmitted to the deep neural network.

In the solution provided herein, multimodal input (audio or text) as the original information is converted into a linguistic pronunciation unit and its feature (that is, linguistic feature) not affected by factors such as a pronouncer and an audio feature, where the linguistic feature is synchronous with audio in a time dimension; and then a time-aligned linguistic feature sequence is input to a preset timing mapping model to obtain a virtual object animation corresponding to the input information, where the preset timing mapping model is pre-obtained by learning.

The solution provided herein does not rely on a particular pronouncer to drive a model, reducing the human cost of animation production.

Further, the solution provided herein can output a high-quality virtual object animation, especially a 3D animation, reducing the labor and time costs incurred by manual processing of the animation by an animator and a painter and improving the production efficiency of the animation.

Further, the solution provided herein has the capability of receiving different types of input information, improving the application range and reducing the production efficiency and costs of an animation.

Further, the solution provided herein can generate both a two-dimensional animation and a three-dimensional animation compared with a conventional end-to-end virtual object animation synthesis technology that can mostly generate only a two-dimensional animation.

The "virtual object animation sequence" in the solution provided herein is a generalized representation of animation data or an animation controller, not limited to a two-dimensional animation or a three-dimensional animation, depending on the form of representation of the "virtual object animation sequence" in the training data used when the preceding preset timing mapping model learns an optimal parameter. After a virtual object animation controller is obtained, the controller may be converted into a corresponding video animation by using software such as Maya or UE.

Figure 4:
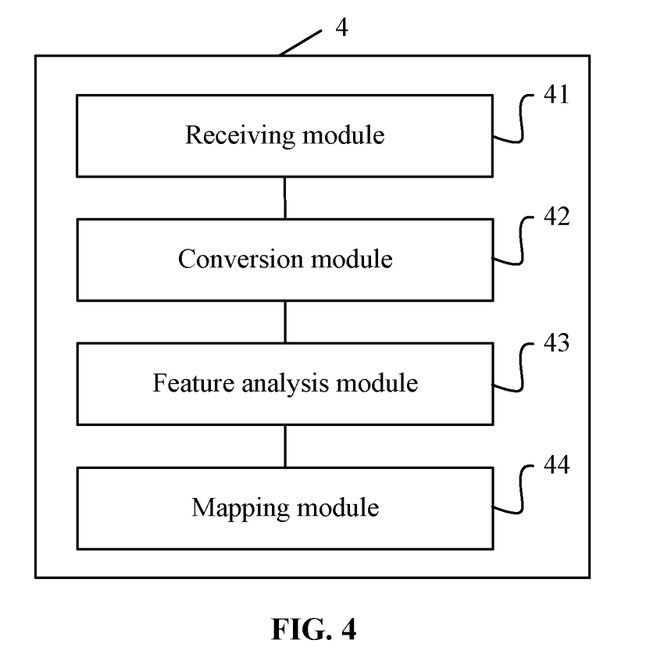
FIG. 4 is a diagram illustrating the structure of an end-to-end virtual object animation generation apparatus according to an embodiment of the present disclosure.

FIG. 4 is a diagram illustrating the structure of an end-to-end virtual object animation generation apparatus according to an embodiment of the present disclosure. It is to be understood by those skilled in the art that the end-to-end virtual object animation generation apparatus 4 of this embodiment can be used to implement the solution of the method of the embodiment illustrated by FIGS. 1 to 3.

Specifically, referring to FIG. 4, the end-to-end virtual object animation generation apparatus 4 of this embodiment may include a receiving module 41 configured to receive input information, where the input information includes text information or audio information of a virtual object animation to be generated; a conversion module 42 configured to convert the input information into a pronunciation unit sequence; a feature analysis module 43 configured to perform a feature analysis of the pronunciation unit sequence to obtain a corresponding linguistic feature sequence; and a mapping module 44 configured to input the linguistic feature sequence into a preset timing mapping model to generate the virtual object animation based on the linguistic feature sequence.

For details about the working principle and the working mode of the end-to-end virtual object animation generation apparatus 4, see related description of FIGS. 1 to 3. These details are not repeated here.

In a typical application scenario, the end-to-end virtual object animation generation method provided herein may be implemented by an end-to-end virtual object animation generation system.

Specifically, the end-to-end virtual object animation generation system may include a collection module for collecting the input information; and the end-to-end virtual object animation generation apparatus 4 of FIG. 4. In the end-to-end virtual object animation generation apparatus, the receiving module 41 is coupled to the collection module to receive the input information. The end-to-end virtual object animation generation apparatus 4 performs the end-to-end virtual object animation generation method of FIGS. 1 to 3 to generate a corresponding virtual object animation.

Further, the collection module may be a character input device such as a keyboard for collecting the text information. The collection module may also be a recording device for collecting the audio information.

Further, the end-to-end virtual object animation generation apparatus may be integrated with a computing device such as a terminal or a server. For example, end-to-end virtual object animation generation apparatuses may be integrated in the same server. Alternatively, end-to-end virtual object animation generation apparatuses may be integrated in multiple terminals or servers and coupled to each other. For example, the preset timing mapping model may be configured on a terminal or server separately to ensure a better data processing speed.

With the end-to-end virtual object animation generation system of this embodiment, a user can obtain a virtual object animation on the end-to-end virtual object animation generation apparatus 4 simply after providing input information on the collection module.

Further, an embodiment of the present disclosure provides a storage medium. The storage medium stores a computer program which, when executed by a processor, causes the processor to perform the method of the embodiment illustrated by FIGS. 1 to 3. Preferably, the storage medium may include a computer-readable storage medium such as a non-volatile memory or a non-transitory memory. The storage medium may include a ROM, a RAM, a magnetic disk, or an optical disk.

Further, an embodiment of the present disclosure provides a terminal. The terminal includes a memory and a processor. The processor is configured to perform the method of the embodiment illustrated by FIGS. 1 to 3 when executing a computer program stored in the memory and executable by the processor.

Optionally, converting the input information into the pronunciation unit sequence includes converting the input information into a pronunciation unit and a corresponding time code; and performing a time alignment operation on the pronunciation unit according to the time code to obtain the pronunciation unit sequence, where the pronunciation unit sequence is a time-aligned sequence.

Optionally, converting the input information into the pronunciation unit and the corresponding time code includes, when the input information is audio information, converting the audio information into the pronunciation unit and the corresponding time code by using a speech recognition technology and a preset pronunciation dictionary.

Optionally, converting the input information into the pronunciation unit and the corresponding time code includes, when the input information is text information, converting the text information into the pronunciation unit and the corresponding time code by using a speech synthesis technology.

Optionally, converting the input information into the pronunciation unit sequence includes, when the input information is audio information, converting the audio information into the pronunciation unit and the corresponding time code by using a speech recognition technology and a preset pronunciation dictionary; and performing a time alignment operation on the pronunciation unit according to the time code to obtain a time-aligned pronunciation unit sequence.

Optionally, converting the input information into the pronunciation unit sequence includes, when the input information is text information, converting the text information into the pronunciation unit and the corresponding time code by using a speech synthesis technology; and performing a time alignment operation on the pronunciation unit according to the time code to obtain a time-aligned pronunciation unit sequence.

Optionally, performing the feature analysis of the pronunciation unit sequence to obtain the corresponding linguistic feature sequence includes performing a feature analysis of each pronunciation unit in the pronunciation unit sequence to obtain a linguistic feature of each pronunciation unit; and generating the corresponding linguistic feature sequence based on the linguistic feature of each pronunciation unit.

Optionally, performing the feature analysis of each pronunciation unit in the pronunciation unit sequence to obtain the linguistic feature of each pronunciation unit includes analyzing a pronunciation feature of each pronunciation unit to obtain an independent linguistic feature of each pronunciation unit; and generating the linguistic feature based on the independent linguistic feature.

Optionally, performing the feature analysis of each pronunciation unit in the pronunciation unit sequence to obtain the linguistic feature of each pronunciation unit includes analyzing a pronunciation feature of each pronunciation unit to obtain an independent linguistic feature of each pronunciation unit; analyzing a pronunciation feature of an adjacent pronunciation unit of each pronunciation unit to obtain an adjacent linguistic feature of each pronunciation unit; and generating the linguistic feature based on the independent linguistic feature and the adjacent linguistic feature.

Optionally, analyzing the pronunciation feature of the adjacent pronunciation unit of each pronunciation unit to obtain the adjacent linguistic feature of each pronunciation unit includes collecting statistics on the type of the pronunciation feature of the adjacent pronunciation unit and the number of pronunciation features of the same type, and obtaining the adjacent linguistic feature according to a statistical result.

Optionally, the preset timing mapping model is configured to map the input linguistic feature sequence to an expression parameter and/or an action parameter of a virtual object according to a time sequence to generate the virtual object animation.

Optionally, inputting the linguistic feature sequence into the preset timing mapping model to generate the virtual object animation based on the linguistic feature sequence includes performing multidimensional information extraction on the linguistic feature sequence based on the preset timing mapping model, where the multidimensional includes time-dimensional and linguistic-feature-dimensional; and performing feature-domain mapping and feature-dimensional transformation on a multidimensional information extraction result based on the preset timing mapping model to obtain the expression parameter and/or the action parameter of the virtual object, where the feature-domain mapping refers to a mapping from a linguistic feature domain to a virtual object animation feature domain, where the virtual object animation feature domain includes an expression feature and/or an action feature of the virtual object.

Optionally, the preset timing mapping model includes a multilayer convolutional network for receiving the linguistic feature sequence and performing multidimensional information extraction on the linguistic feature sequence; and a deep neural network coupled to the multilayer convolutional network and configured to receive the multidimensional information extraction result output by the multilayer convolutional network and perform feature-domain mapping and feature-dimensional transformation on the multidimensional information extraction result to obtain the expression parameter and/or the action parameter of the virtual object.

Optionally, the deep neural network includes multiple fully-connected layers connected in series; and multiple non-linear transformation modules, where each of the multiple non-linear transformation modules is coupled between two adjacent fully-connected layers of the multiple fully-connected layers other than the last fully-connected layer of the multiple fully-connected layers and is configured to perform non-linear transformation processing on an output result of an upper coupled fully-connected layer of the two adjacent fully-connected layers and input a non-linear transformation processing result into a lower coupled fully-connected layer of the two adjacent fully-connected layers.

Optionally, after performing the multidimensional information extraction on the linguistic feature sequence based on the preset timing mapping model and before performing the feature-domain mapping and the feature-dimensional transformation on the multidimensional information extraction result based on the preset timing mapping model, the method also includes performing information aggregation processing on a time-dimensional information extraction result based on the preset timing mapping model and using a processing result as the time-dimensional information extraction result.

Optionally, the preset timing mapping model includes a long short-term memory network for performing information aggregation processing on the time-dimensional information extraction result.

Optionally, the expression parameter of the virtual object includes a controller for generating a lip animation.

Optionally, the pronunciation unit sequence and the linguistic feature sequence are each a time-aligned sequence.

To solve the preceding problem, an embodiment of the present disclosure provides an end-to-end virtual object animation generation apparatus. The apparatus includes a receiving module configured to receive input information, where the input information includes text information or audio information of a virtual object animation to be generated; a conversion module configured to convert the input information into a pronunciation unit sequence; a feature analysis module configured to perform a feature analysis of the pronunciation unit sequence to obtain a corresponding linguistic feature sequence; and a mapping module configured to input the linguistic feature sequence into a preset timing mapping model to generate the virtual object animation based on the linguistic feature sequence.

To solve the preceding problem, an embodiment of the present disclosure provides a storage medium. The storage medium stores a computer program which, when executed by a processor, causes the processor to perform steps of the preceding method.

To solve the preceding problem, an embodiment of the present disclosure provides a terminal.

The terminal includes a memory and a processor. The processor is configured to perform steps of the preceding method when executing a computer program stored in the memory and executable by the processor.

Compared with the existing art, the solution of embodiments of the present disclosure has the following beneficial effects:

An embodiment of the present disclosure provides an end-to-end virtual object animation generation method. The method includes receiving input information, where the input information includes text information or audio information of a virtual object animation to be generated; converting the input information into a pronunciation unit sequence; performing a feature analysis of the pronunciation unit sequence to obtain a corresponding linguistic feature sequence; and inputting the linguistic feature sequence into a preset timing mapping model to generate the virtual object animation based on the linguistic feature sequence.

Compared with an existing solution that must use a particular speech feature of a dubber to drive end-to-end virtual object animation generation, a more general-purpose end-to-end virtual object animation generation solution is provided herein to generate a virtual object animation, especially a 3D animation, quickly and automatically. The present solution involves more input selections.

Specifically, a corresponding linguistic feature sequence in the original audio or text is extracted as input information of a preset timing mapping model. The linguistic feature is related to only the semantic content of the audio and is not related to a tone color, a pitch, a fundamental frequency F0, and other features that vary with pronouncers; therefore, the present solution is not limited by a particular pronouncer. The preset timing mapping model is applicable to original audios having different audio features. That is, since the present solution does not analyze an audio feature in audio information, but converts the audio information into a pronunciation unit and analyzes a linguistic feature of the pronunciation unit, making it possible to generate a virtual object animation without relying on a particular audio feature to drive a neural network model. Thereby, the end-to-end virtual object animation generation method of the present solution is applicable to end-to-end virtual object animation (especially 3D animation) generation of any dubber and any text, solving the problem in which an existing end-to-end automatic virtual object animation technology featured by a speech synthesis relies on a particular dubber and truly achieving generality of this technology.

Then, a preset timing mapping model is constructed after being trained by the deep learning technology, and an input linguistic feature sequence is mapped to an expression parameter and/or an action parameter of the corresponding virtual object by using the preset timing mapping model. The animation generation process does not require the participation of an animator and a painter and completely relies on the automatic calculation of a computer, greatly reducing the labor and time costs and truly achieving an end-to-end automatic virtual object animation synthesis technology.

Further, the received original input information may be text information or audio information so that the present solution can generate a corresponding virtual object animation according to different input modes.

The present disclosure is not limited to what is described herein. Those skilled in the art may make any modifications and changes without departing from the spirit and scope of the present disclosure; therefore, the scope of the present disclosure is defined by the claims.

What is claimed is:

1. An end-to-end virtual object animation generation method, comprising:
    receiving input information, wherein the input information comprises text information or audio information of a virtual object animation to be generated;
    converting the input information into a pronunciation unit sequence;
    performing a feature analysis of the pronunciation unit sequence to obtain a corresponding linguistic feature sequence; and
    inputting the linguistic feature sequence into a preset timing mapping model to generate the virtual object animation based on the linguistic feature sequence;
    wherein performing the feature analysis of the pronunciation unit sequence to obtain the corresponding linguistic feature sequence comprises:
    performing a feature analysis of each pronunciation unit in the pronunciation unit sequence to obtain a linguistic feature of the each pronunciation unit; and
    generating the corresponding linguistic feature sequence based on the linguistic feature of the each pronunciation unit; and
    wherein performing the feature analysis of the each pronunciation unit in the pronunciation unit sequence to obtain the linguistic feature of the each pronunciation unit comprises:
    analyzing a pronunciation feature of the each pronunciation unit to obtain an independent linguistic feature of the each pronunciation unit;
    analyzing a pronunciation feature of an adjacent pronunciation unit of the each pronunciation unit to obtain an adjacent linguistic feature of the each pronunciation unit; and
    generating the linguistic feature based on the independent linguistic feature and the adjacent linguistic feature.

2. The virtual object animation generation method of claim 1, wherein converting the input information into the pronunciation unit sequence comprises:
    converting the input information into a plurality of pronunciation units and a plurality of corresponding time codes; and
    performing a time alignment operation on the plurality of pronunciation units according to the plurality of corresponding time codes to obtain the pronunciation unit sequence, wherein the pronunciation unit sequence is a time-aligned sequence.

3. The virtual object animation generation method of claim 2, wherein converting the input information into the plurality of pronunciation units and the plurality of corresponding time codes comprises:
    when the input information is the audio information, converting the audio information into the plurality of pronunciation units and the plurality of corresponding time codes by using a speech recognition technology and a preset pronunciation dictionary.

4. The virtual object animation generation method of claim 2, wherein converting the input information into the plurality of pronunciation units and the plurality of corresponding time codes comprises:
    when the input information is the text information, converting the text information into the plurality of pronunciation units and the plurality of corresponding time codes by using a speech synthesis technology.

5. The virtual object animation generation method of claim 1, wherein performing the feature analysis of the each pronunciation unit in the pronunciation unit sequence to obtain the linguistic feature of the each pronunciation unit comprises:
    analyzing a pronunciation feature of the each pronunciation unit to obtain an independent linguistic feature of the each pronunciation unit; and
    generating the linguistic feature based on the independent linguistic feature.

6. The virtual object animation generation method of claim 1, wherein analyzing the pronunciation feature of the adjacent pronunciation unit of the each pronunciation unit to obtain the adjacent linguistic feature of the each pronunciation unit comprises:
    collecting statistics on a type of the pronunciation feature of the adjacent pronunciation unit and a number of pronunciation features of a same type, and obtaining the adjacent linguistic feature according to a statistical result.

7. The virtual object animation generation method of claim 1, wherein the preset timing mapping model is configured to map the input linguistic feature sequence to at least one of an expression parameter or an action parameter of a virtual object according to a time sequence to generate the virtual object animation.

8. The virtual object animation generation method of claim 7, wherein inputting the linguistic feature sequence into the preset timing mapping model to generate the virtual object animation based on the linguistic feature sequence comprises:
  performing multidimensional information extraction on the linguistic feature sequence based on the preset timing mapping model, wherein the multidimensional information extraction comprises time-dimensional information extraction and linguistic-feature-dimensional information extraction; and
  performing feature-domain mapping and feature-dimensional transformation on a multidimensional information extraction result based on the preset timing mapping model to obtain the at least one of the expression parameter or the action parameter of the virtual object, wherein the feature-domain mapping refers to a mapping from a linguistic feature domain to a virtual object animation feature domain, wherein the virtual object animation feature domain comprises an expression feature and/or an action feature of the virtual object.

9. The virtual object animation generation method of claim 8, wherein the preset timing mapping model comprises:
  a multilayer convolutional network for receiving the linguistic feature sequence and performing the multidimensional information extraction on the linguistic feature sequence; and
  a deep neural network coupled to the multilayer convolutional network and configured to receive the multidimensional information extraction result output by the multilayer convolutional network and perform the feature-domain mapping and the feature-dimensional transformation on the multidimensional information extraction result to obtain the expression parameter and/or the action parameter of the virtual object.

10. The virtual object animation generation method of claim 9, wherein the deep neural network comprises:
  multiple fully-connected layers connected in series; and
  multiple non-linear transformation modules, wherein each of the multiple non-linear transformation modules is coupled between two adjacent fully-connected layers of the multiple fully-connected layers other than a last fully-connected layer of the multiple fully-connected layers and is configured to perform non-linear transformation processing on an output result of an upper coupled fully-connected layer of the two adjacent fully-connected layers and input a non-linear transformation processing result into a lower coupled fully-connected layer of the two adjacent fully-connected layers.

11. The virtual object animation generation method of claim 8, after performing the multidimensional information extraction on the linguistic feature sequence based on the preset timing mapping model and before performing the feature-domain mapping and the feature-dimensional transformation on the multidimensional information extraction result based on the preset timing mapping model, the method further comprising:
  performing information aggregation processing on a time-dimensional information extraction result based on the preset timing mapping model and using a processing result as the time-dimensional information extraction result.

12. The virtual object animation generation method of claim 11, wherein the preset timing mapping model comprises:
  a long short-term memory network for performing the information aggregation processing on the time-dimensional information extraction result.

13. The virtual object animation generation method of claim 7, wherein the expression parameter of the virtual object comprises a controller for generating a lip animation.

14. The virtual object animation generation method of claim 1, wherein the pronunciation unit sequence and the linguistic feature sequence are each a time-aligned sequence.

15. A non-transitory storage medium, storing a computer program which, when executed by a processor, causes the processor to perform the following steps:
  receiving input information, wherein the input information comprises text information or audio information of a virtual object animation to be generated;
  converting the input information into a pronunciation unit sequence;
  performing a feature analysis of the pronunciation unit sequence to obtain a corresponding linguistic feature sequence; and
  inputting the linguistic feature sequence into a preset timing mapping model to generate the virtual object animation based on the linguistic feature sequence;
  wherein performing the feature analysis of the pronunciation unit sequence to obtain the corresponding linguistic feature sequence comprises:
  performing a feature analysis of each pronunciation unit in the pronunciation unit sequence to obtain a linguistic feature of the each pronunciation unit; and
  generating the corresponding linguistic feature sequence based on the linguistic feature of the each pronunciation unit; and
  wherein performing the feature analysis of the each pronunciation unit in the pronunciation unit sequence to obtain the linguistic feature of the each pronunciation unit comprises:
  analyzing a pronunciation feature of the each pronunciation unit to obtain an independent linguistic feature of the each pronunciation unit:
  analyzing a pronunciation feature of an adjacent pronunciation unit of the each pronunciation unit to obtain an adjacent linguistic feature of the each pronunciation unit; and
  generating the linguistic feature based on the independent linguistic feature and the adjacent linguistic feature.

16. A terminal, comprising a memory and a processor, wherein the memory stores a computer program executable by the processor, and the processor is configured to perform the following steps: receiving input information, wherein the input information comprises text information or audio information of a virtual object animation to be generated;
  converting the input information into a pronunciation unit sequence;
  performing a feature analysis of the pronunciation unit sequence to obtain a corresponding linguistic feature sequence; and
  inputting the linguistic feature sequence into a preset timing mapping model to generate the virtual object animation based on the linguistic feature sequence;
  wherein performing the feature analysis of the pronunciation unit sequence to obtain the corresponding linguistic feature sequence comprises:
  performing a feature analysis of each pronunciation unit in the pronunciation unit sequence to obtain a linguistic feature of the each pronunciation unit; and generating the corresponding linguistic feature sequence based on the linguistic feature of the each pronunciation unit; and wherein performing the feature analysis of the each pronunciation unit in the pronunciation unit sequence to obtain the linguistic feature of the each pronunciation unit comprises:

analyzing a pronunciation feature of the each pronunciation unit to obtain an independent linguistic feature of the each pronunciation unit;

analyzing a pronunciation feature of an adjacent pronunciation unit of the each pronunciation unit to obtain an adjacent linguistic feature of the each pronunciation unit; and generating the linguistic feature based on the independent linguistic feature and the adjacent linguistic feature.

17. The terminal of claim 16, wherein converting the input information into the pronunciation unit sequence comprises:

converting the input information into a plurality of pronunciation units and a plurality of corresponding time codes; and performing a time alignment operation on the plurality of pronunciation units according to the plurality of corresponding time codes to obtain the pronunciation unit sequence, wherein the pronunciation unit sequence is a time-aligned sequence.

18. The terminal of claim 17, wherein converting the input information into the plurality of pronunciation units and the plurality of corresponding time codes comprises:

when the input information is the audio information, converting the audio information into the plurality of pronunciation units and the plurality of corresponding time codes by using a speech recognition technology and a preset pronunciation dictionary.

* * * * *